United States Patent
Menard et al.

(10) Patent No.: US 9,213,388 B2
(45) Date of Patent: Dec. 15, 2015

(54) DELAYING RESET SIGNALS IN A MICROCONTROLLER SYSTEM

(71) Applicant: Atmel Corporation, San Jose, CA (US)

(72) Inventors: Patrice Menard, Saint-Mars-du-Desert (FR); Mickael Le Dily, Carquefou (FR); Thierry Gourbilleau, Le Loroux-Bottereau (FR)

(73) Assignee: Atmel Corporation, San Jose, CA (US)

( * ) Notice: Subject to any disclaimer, the term of this patent is extended or adjusted under 35 U.S.C. 154(b) by 246 days.

(21) Appl. No.: 13/785,999

(22) Filed: Mar. 5, 2013

(65) Prior Publication Data

US 2014/0089706 A1 Mar. 27, 2014

Related U.S. Application Data

(60) Provisional application No. 61/704,037, filed on Sep. 21, 2012.

(51) Int. Cl.
*G06F 1/32* (2006.01)
*G06F 1/24* (2006.01)

(52) U.S. Cl.
CPC ... *G06F 1/32* (2013.01); *G06F 1/24* (2013.01)

(58) Field of Classification Search
CPC ............... G06F 1/24; G06F 1/32; G06F 1/26
See application file for complete search history.

(56) References Cited

U.S. PATENT DOCUMENTS

| | | | |
|---|---|---|---|
| 4,475,134 A | 10/1984 | Bowden et al. | |
| 4,677,566 A | 6/1987 | Whittaker et al. | |
| 4,703,486 A * | 10/1987 | Bemis | H04L 12/433 370/245 |
| 5,579,498 A | 11/1996 | Ooi | |
| 5,623,234 A | 4/1997 | Shaik et al. | |
| 6,163,851 A | 12/2000 | Yamazoe et al. | |
| 6,175,891 B1 | 1/2001 | Norman et al. | |
| 6,255,878 B1 * | 7/2001 | Gauvin et al. | 327/263 |
| 6,320,717 B1 | 11/2001 | Feng | |
| 6,393,080 B1 | 5/2002 | Kamoshida et al. | |
| 6,462,830 B1 | 10/2002 | Negishi | |
| RE38,108 E | 5/2003 | Chee | |
| 6,754,836 B2 | 6/2004 | Shimizue et al. | |
| 6,848,055 B1 * | 1/2005 | Yarch | 713/300 |
| 7,203,855 B2 | 4/2007 | Chou | |
| 7,391,250 B1 | 6/2008 | Chuang | |
| 7,574,683 B2 | 8/2009 | Wilson | |
| 7,895,458 B2 | 2/2011 | Kim | |
| 8,190,931 B2 | 5/2012 | Laurenti et al. | |
| 8,255,722 B2 | 8/2012 | Pedersen et al. | |
| 2003/0006807 A1 | 1/2003 | Masuda et al. | |

(Continued)

OTHER PUBLICATIONS

Non-Final Office Action dated Apr. 9, 2015; U.S. Appl. No. 13/788,366, filed Mar. 7, 2013, 15 pages.

(Continued)

*Primary Examiner* — Thomas Lee
*Assistant Examiner* — Chad Erdman
(74) *Attorney, Agent, or Firm* — Fish & Richardson P.C.

(57) ABSTRACT

A microcontroller system includes a reset delaying module that is configured to, during a power saving mode, receive and delay a reset signal from a reset source. The reset delaying module waits for a regulator ready signal from a voltage regulator because, prior to the reset signal, the voltage regulator is in a power saving mode. In response to receiving the regulator ready signal, the reset delaying module releases the reset, e.g., to a reset controller.

16 Claims, 5 Drawing Sheets

(56) References Cited

U.S. PATENT DOCUMENTS

| | | |
|---|---|---|
| 2003/0177404 A1 | 9/2003 | Jorgenson et al. |
| 2003/0183024 A1 | 10/2003 | Lohberg et al. |
| 2003/0198108 A1 | 10/2003 | Hausmann et al. |
| 2004/0148548 A1 | 7/2004 | Moyer |
| 2004/0158773 A1 | 8/2004 | Kang |
| 2005/0083081 A1 | 4/2005 | Jacobson et al. |
| 2007/0260794 A1 | 11/2007 | Ashish et al. |
| 2008/0072094 A1 | 3/2008 | Hayano et al. |
| 2008/0189455 A1 | 8/2008 | Dreps et al. |
| 2008/0211559 A1 | 9/2008 | Tanaka |
| 2009/0135751 A1 | 5/2009 | Hodges |
| 2009/0153210 A1 | 6/2009 | Wang et al. |
| 2009/0204835 A1 | 8/2009 | Smith et al. |
| 2009/0256607 A1 | 10/2009 | Smith et al. |
| 2009/0259863 A1 | 10/2009 | Williams et al. |
| 2010/0156458 A1 | 6/2010 | Speers |
| 2010/0306570 A1 | 12/2010 | Uchida et al. |
| 2011/0060931 A1 | 3/2011 | Radhakrishnan |
| 2011/0131427 A1 | 6/2011 | Jorgenson et al. |
| 2011/0138200 A1 | 6/2011 | Tomizawa |
| 2011/0208888 A1 | 8/2011 | Park |
| 2011/0221483 A1* | 9/2011 | Liu et al. .................. 327/142 |
| 2011/0252251 A1 | 10/2011 | De Cesare et al. |
| 2011/0264902 A1 | 10/2011 | Hollingworth |
| 2012/0017099 A1 | 1/2012 | David |
| 2012/0047402 A1 | 2/2012 | Chen et al. |
| 2012/0120958 A1 | 5/2012 | Mahadevan et al. |
| 2012/0268995 A1 | 10/2012 | Sugimoto et al. |
| 2013/0063114 A1 | 3/2013 | Agrawal et al. |
| 2013/0067250 A1 | 3/2013 | Wu et al. |
| 2013/0073878 A1 | 3/2013 | Jayasimha et al. |
| 2013/0097445 A1 | 4/2013 | Palaniappan et al. |
| 2013/0124895 A1 | 5/2013 | Saha et al. |
| 2013/0339589 A1 | 12/2013 | Qawami et al. |
| 2014/0089707 A1 | 3/2014 | Jouin et al. |
| 2014/0089708 A1 | 3/2014 | Menard et al. |
| 2014/0089714 A1 | 3/2014 | Pedersen et al. |
| 2014/0281648 A1 | 9/2014 | Russell et al. |
| 2014/0301152 A1 | 10/2014 | Cox et al. |
| 2015/0095681 A1 | 4/2015 | Jouin et al. |

OTHER PUBLICATIONS

Non-Final Office Action dated Mar. 12, 2015, U.S. Appl. No. 13/786,042, filed Mar. 5, 2013 (14 pages).

U.S. Appl. No. 13/789,902, filed Mar. 8, 2013, non-final office action dated May 15, 2015, (15 pages).

US Non-Final Office Action in U.S. Appl. No. 12/400,690, dated Sep. 12, 2011, 7 pages.

US Final Office Action in U.S. Appl. No. 12/400,690, dated Jan. 11, 2012, 7 pages.

US Notice of Allowance in U.S. Appl. No. 12/400,690, dated May 9, 2012, 6 pages.

US Non-Final Office Action in U.S. Appl. No. 14/043,445, dated Aug. 25, 2015, 12 pages.

US Final Office Action in U.S. Appl. No. 13/789,902, dated Sep. 2, 2015, 18 pages.

US Notice of Allowance in U.S. Appl. No. 13/788,366, dated Oct. 13, 2015, 20 pages.

US Final Office Action in U.S. Appl. No. 13/786,042, dated Sep. 10, 2015, 13 pages.

* cited by examiner

DELAYING RESET SIGNALS IN A MICROCONTROLLER SYSTEM

CROSS-REFERENCE TO RELATED APPLICATIONS

This application claims the benefit and priority of U.S. Provisional Application Ser. No. 61/704,037, filed Sep. 21, 2012, the entire contents of which is hereby incorporated by reference.

TECHNICAL FIELD

This disclosure relates generally to electronics and more particularly to microcontroller systems.

BACKGROUND

Low power consumption is an increasingly important parameter for microcontroller systems. The active power consumption in a microcontroller system is normally dominated by switching activity in the circuit and is proportional to the clock frequency applied to digital logic. Analog modules also contribute a substantially fixed current consumption, which can dominate at low frequencies or in low-power modes. Clocked peripheral modules in the microcontroller system are typically unavailable in ultra-low power, unclocked sleep modes, forcing applications to rely on higher-power clocked modes.

Conventional power reduction solutions for saving power in a microcontroller require that the clock to the Central Processing Unit (CPU) or peripheral modules be switched off, typically by implementing one or more sleep modes in the microcontroller. This solution can be extended until all clocks and analog modules have been switched off, and only leakage current remains, which is typically several orders of magnitude less than active current. The disadvantage of this conventional approach is that the functionality of the device is reduced, since some peripherals are designed to operate with a clock running

SUMMARY

A microcontroller system includes a reset delaying module that is configured to, during a power saving mode, receive and delay a reset signal from a reset source. The reset delaying module waits for a regulator ready signal from a voltage regulator because, prior to the reset signal, the voltage regulator is in a power saving mode. In response to receiving the regulator ready signal, the reset delaying module releases the reset, e.g., to a reset controller.

Particular implementations of the microcontroller system can provide one or more of the following advantages: 1) the startup sequence of the microcontroller in response to a reset signal can be controlled without changing the design of reset sources or a reset controller; 2) the startup sequence can be controlled without software intervention; 3) the startup sequence can be controlled for both short and long reset waveforms; and 4) during reset, a clock does not need to be enabled due to the asynchronous structure of the reset delaying module.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
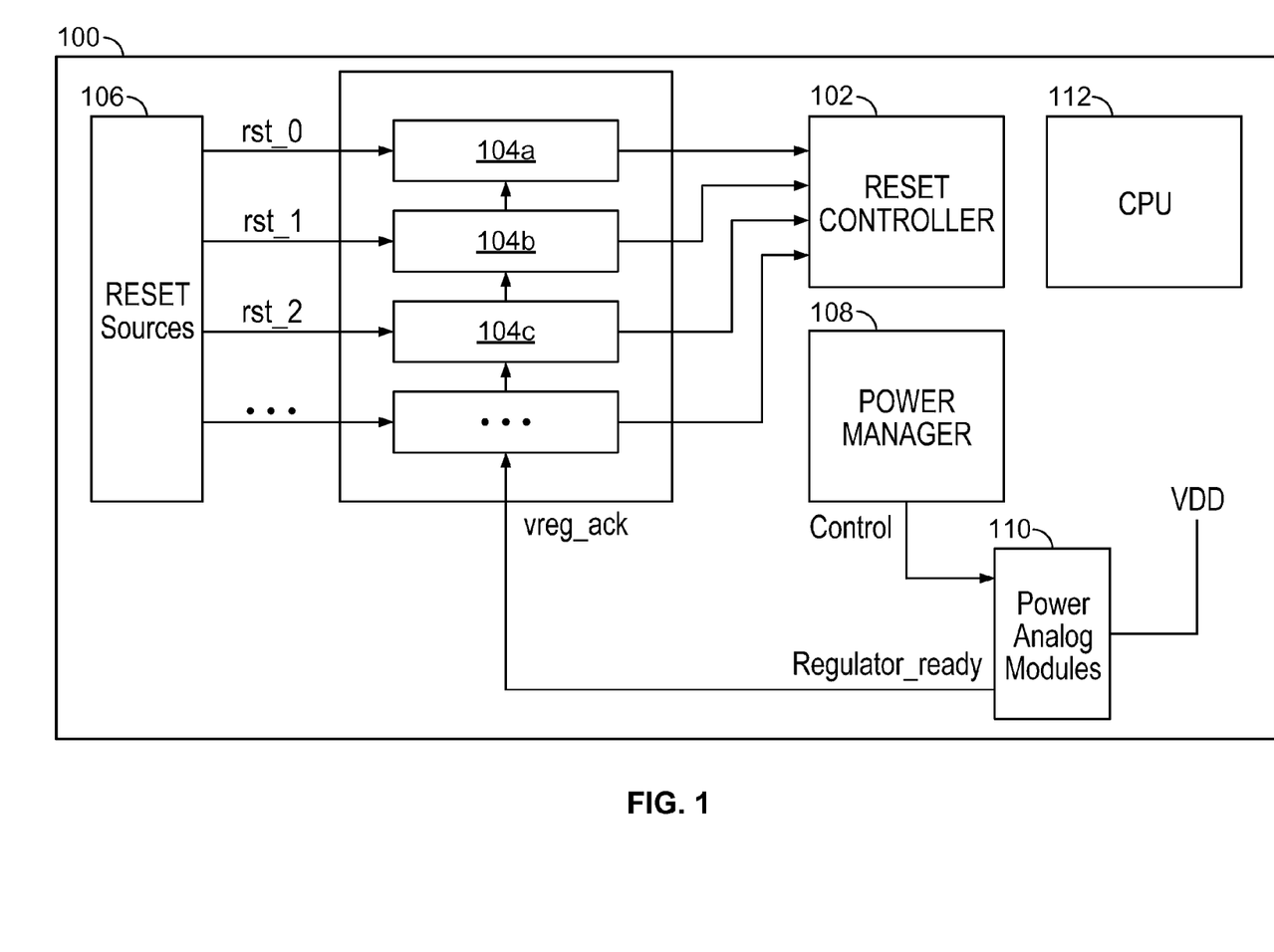
FIG. 1 is a schematic diagram of an example microcontroller system.

FIG. 1 is a schematic diagram of an example microcontroller system 100 including a reset controller 102, reset delaying modules 104a-c, reset sources 106 (e.g., one or more peripheral modules), a power manager 108, one or more power analog modules (e.g., a voltage regulator), and a processor 112 (e.g., a central processing unit).

The power manager can configure the microcontroller system to operate in a run mode and one or more low power modes, for example, a retention mode and a sleep mode. In the sleep mode, the processor is frozen, e.g., by clock gating, and the internal voltage value (VDD) is the same as it is in the run mode.

In the retention mode, VDD is lower than in the run mode, which is useful, for example, to reduce leakage current. The reduced VDD is sufficiently large for some or all of the logic cells in the microcontroller system to retain logic values. Also, in the retention mode, the clock is frozen and a voltage regulator is drawing a limited output current.

When the microcontroller system is reset from the retention mode, there may be a delay in restoring VDD to its full value in the run mode. One or more of the power analog modules may be able to operate using the lower VDD while the microcontroller system is waking, but typically the processor (and perhaps other modules, e.g., the flash memory or other digital logic modules) are configured to wait until one or more of the power analog modules (e.g., the regulator) are stabilized and the full VDD is available.

For example, when one of the reset sources issues a reset, the startup time for some functionality of the microcontroller system can be reduced by configuring the power analog modules to start operating immediately in response to the reset and configuring the processor and/or one or more other digital modules to wait. The power manager can implement this startup sequence using the reset delaying modules, while avoiding modifying the software for the processor or the reset sources.

In operation, the power manager configures a reset delaying module to receive and hold a delay from a reset source while the microcontroller is in the retention mode. In response to receiving the reset, the power manager causes the microcontroller system to exit the retention mode. In some implementations, the microcontroller system partially exits the retention mode. For example, the power analog modules can be reset to a normal operational mode while some other digital logic modules remain in the retention mode. When the microcontroller system completes or substantially completes exiting the retention mode, the power manager configures the reset delaying module to propagate the reset. By configuring the reset delaying modules appropriately, the reset delaying modules can capture both long and short reset signals, including reset signals with a duration shorter than the time it takes for the microcontroller to exit the retention mode.

Example Reset Delaying Module

Figure 2:
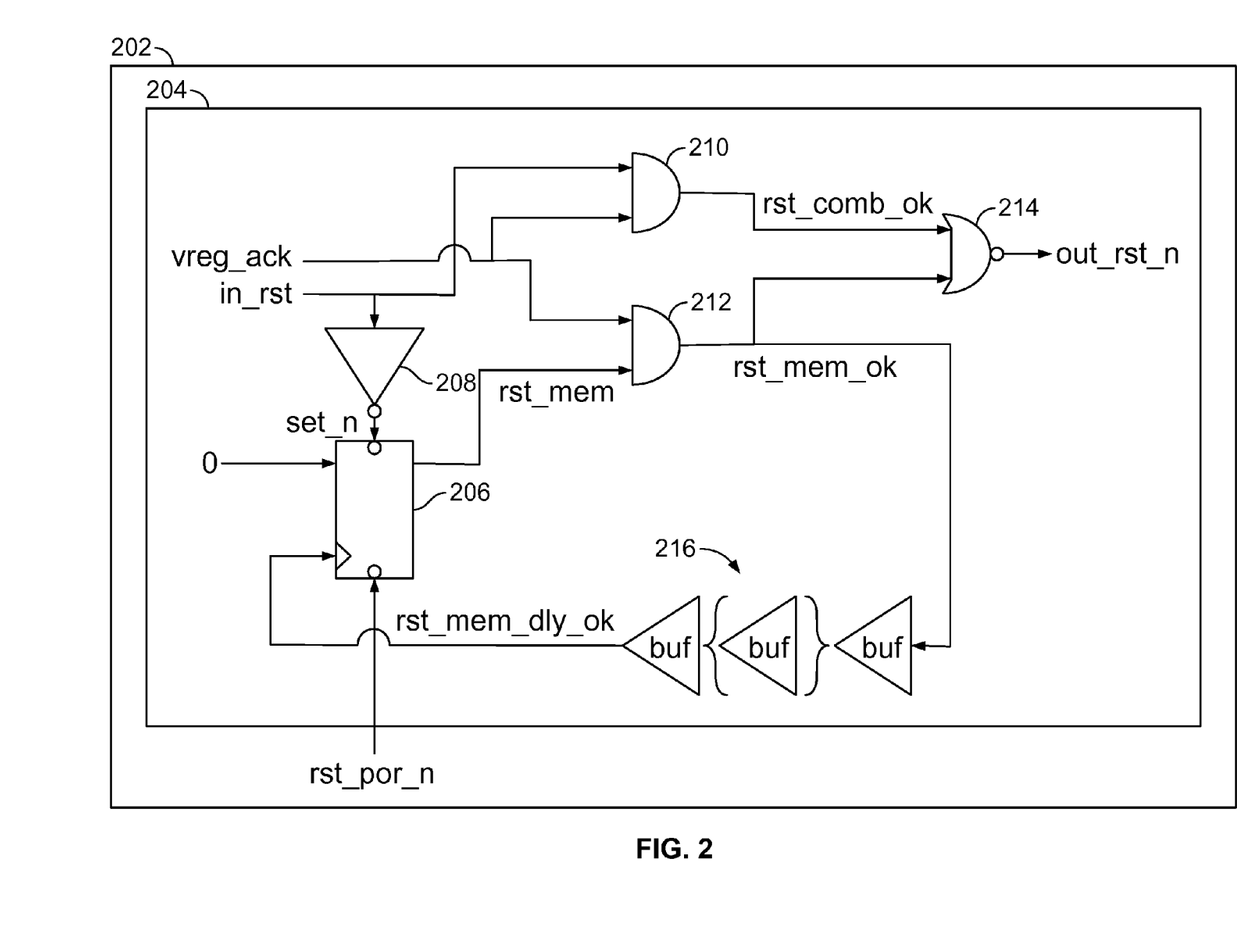
FIG. 2 is a schematic diagram of an example reset delaying module of a microcontroller system.

FIG. 2 is a schematic diagram of an example reset delaying module 204 of a microcontroller system 202.

The reset delaying module includes a latch 206 and a delay chain 216. The latch can be, for example, a set-reset (SR) latch. The latch is configured to receive a reset signal, "in_rst," via an inverter 208. The latch is also configured to receive a "rst_por_n" signal to indicate whether a power on reset problem occurs, e.g., to initialize the latch during power up. The latch is also coupled to a constant logic "0" at its clock input and the output of the delay chain, which provides a "rst_mem_dly_ok" signal.

The in_rst signal is also coupled to a first AND gate 210. The other input of the first AND gate 210 is coupled to a "vreg_ack" signal that indicates that the regulator is providing at least a substantial fraction of a target run mode voltage after regulator wakeup. An output of the latch is coupled to a second AND gate 212. The other input of the second AND gate is coupled to the vreg_ack signal.

The outputs of the first and second AND gates are coupled to a NAND gate 214. The output of the NAND gate provides the delayed reset signal, "out_rst_n." The output of the second AND gate is also coupled into an input of the delay chain. The delay chain can comprise, for example, one or more inverters coupled in series.

The number and size of the inverters can be tailored to the particular microcontroller system to ensure that the reset is delayed a sufficient length of time to allow the microcontroller system, which may implement several thousand flip-flops, to be correctly reset. The delay chain ensures a minimum pulse width of the output reset, even where the input reset is short. In some implementations, the delay chain comprises ten inverters, each inverter having a delay of about 0.5 ns, so that the pulse width is at least 5 ns. The operation of the microcontroller system will be described with reference to the example timing diagrams of FIG. 3 and FIG. 4.

Timing Diagram of Example Scenario

Figure 3:
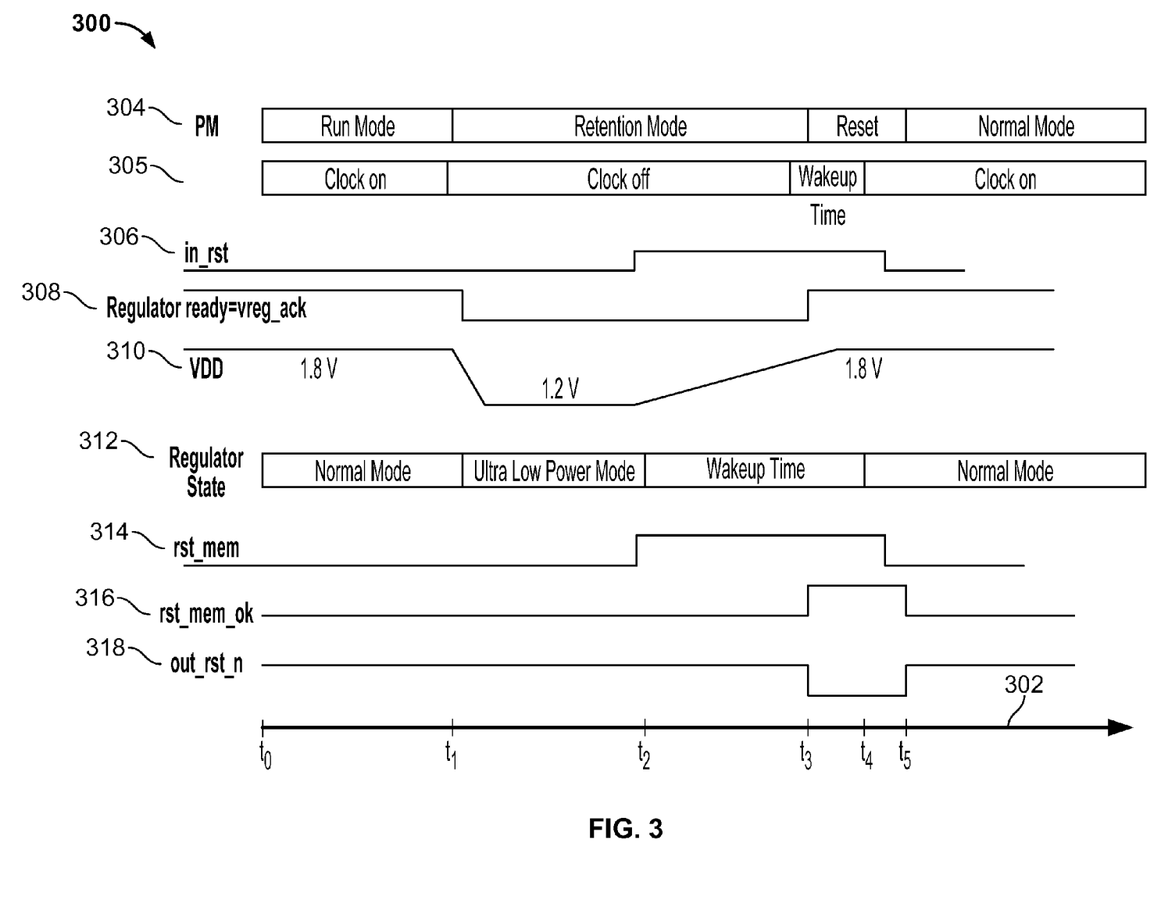
FIG. 3 is an example timing diagram illustrating an example scenario of operation of the microcontroller system of FIG. 2.

FIG. 3 is an example timing diagram 300 illustrating an example scenario of operation of the microcontroller system 200 of FIG. 2. The timing diagram illustrates a number of events along a timeline 302.

The first row 304 of the timing diagram illustrates the state of the power manager. The next row 305 illustrates the state of the clock. The next row 306 illustrates the "in_rst" signal from a reset source. The next row 308 illustrates the vreg_ack signal from the regulator indicating that the regulator is ready, e.g., that the regulator is providing at least a substantial fraction of the target run mode voltage.

The next row 312 illustrates the regulator status. The regulator can be in normal mode, supplying a VDD of 1.8V, or an ultra low power mode, supplying a VDD of 1.2V. When the regulator switches between the ultra low power mode, the regulator ramps up from 1.2V to 1.8V.

The next row 314 illustrates a "rst_mem" signal from the output of the latch to an input of the second AND gate 212. The next row 316 illustrates a "rst_mem_ok" signal from the output of the second AND gate 212 to the input of the delay chain and one of the inputs of the NAND gate 214. The last row 318 illustrates an "out_rst_n" signal from the output of the NAND gate 214.

At time t0, the power manager has configured the microcontroller system to operate in the run mode. The clock is on and the regulator is ready and providing 1.8V. At time t1, the power manager configures the microcontroller to enter the retention mode. The regulator drops VDD to 1.2 V and the vreg_ack signal falls to a logic "0" level. The clock is frozen. The out_rst_n is at a logic "1" level.

At time t2, the reset source generates a reset, and the in_rst signal rises to a logic "1" level. The reset_mem signal also rises. The regulator begins raising VDD from 1.2V to 1.8V. The out_rst_n signal remains at a logic "1" level, and the reset delaying module is holding the reset. The clock begins waking when VDD reaches a certain voltage.

At t3, VDD reaches a substantial fraction of the 1.8V target voltage, and the vreg_ack signal rises. In response, the rst_mem_ok signal rises, and the out_rst_n signal falls to a logic "0" level. At t4, the clock wakes and the rst_mem signal falls. At t5, the rst_mem_ok signal falls, and the out_rst_n signal rises, so that the reset is released.

Timing Diagram of Example Scenario—Short Reset

Figure 4:
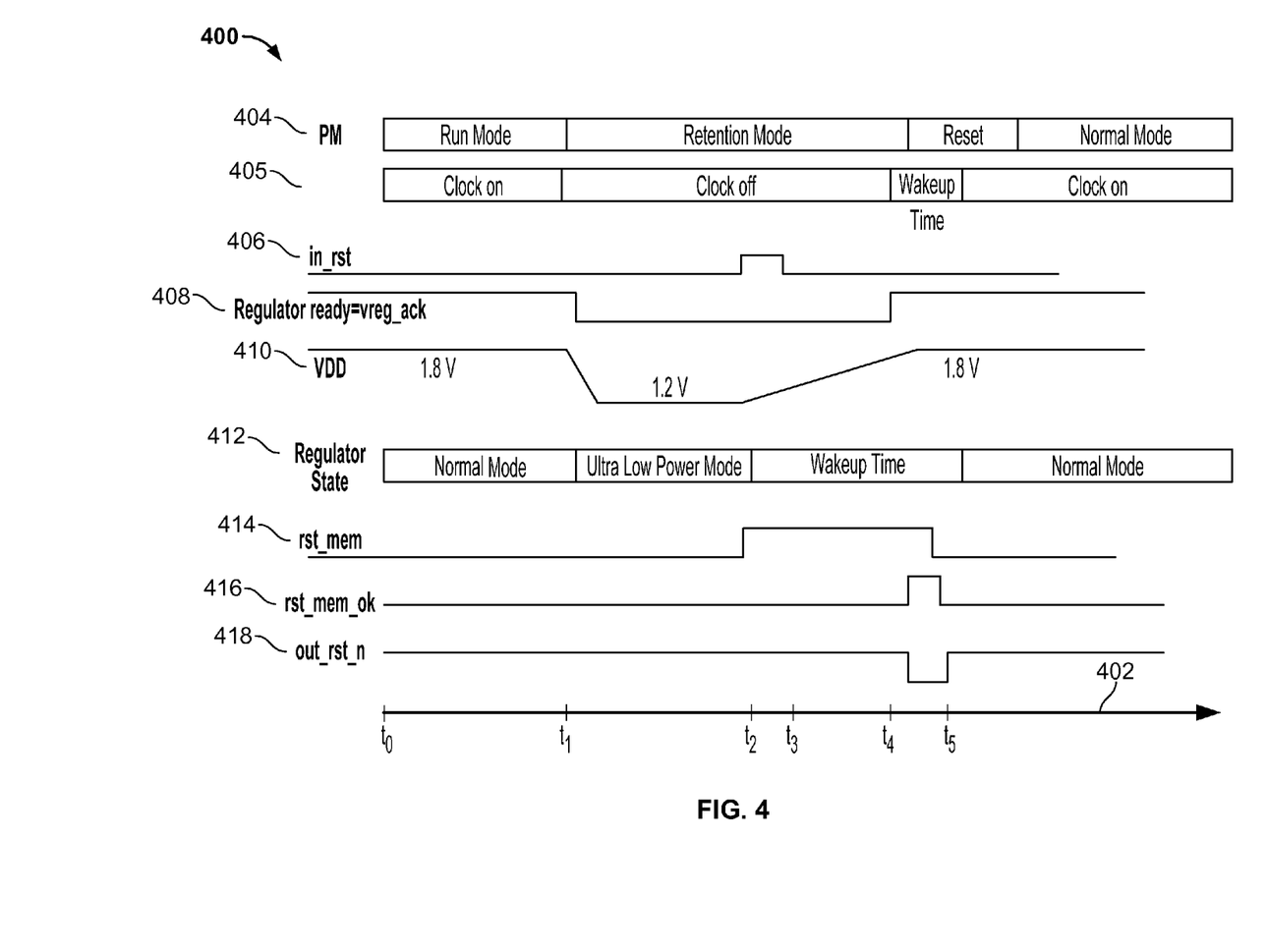
FIG. 4 is an example timing diagram illustrating an example scenario of operation of the microcontroller system of FIG. 2.

FIG. 4 is an example timing diagram 400 illustrating an example scenario of operation of the microcontroller system 200 of FIG. 2. The timing diagram illustrates a number of events along a timeline 402. The rows 404-418 correspond to the rows 304-318 described above with reference to FIG. 3.

At time t0, the power manager has configured the microcontroller system to operate in the run mode. The clock is on and the regulator is ready and providing 1.8V. At time t1, the power manager configures the microcontroller to enter the retention mode. The regulator drops VDD to 1.2 V and the vreg_ack signal falls to a logic "0" level. The clock is frozen. The out_rst_n is at a logic "1" level.

At time t2, the reset source generates a reset, and the in_rst signal rises to a logic "1" level. The reset_mem signal also rises. The regulator begins raising VDD from 1.2V to 1.8V. The out_rst_n signal remains at a logic "1" level, and the reset delaying module is holding the reset. At t3, the in_rst signal falls. Hence the reset was a short reset, having a duration shorter than the wakeup time of the regulator. The clock begins waking when VDD reaches a certain voltage.

At t4, VDD reaches a substantial fraction of the 1.8V target voltage, and the vreg_ack signal rises. In response, the clock wakes, the rst_mem_ok signal rises, and the out rst n signal falls to a logic "0" level. At t5 (related to the delay chain), the rst_mem signal falls, and the rst_mem_ok falls. The out_rst_n signal rises, so that the reset is released.

Example Testing Flowchart

Figure 5:
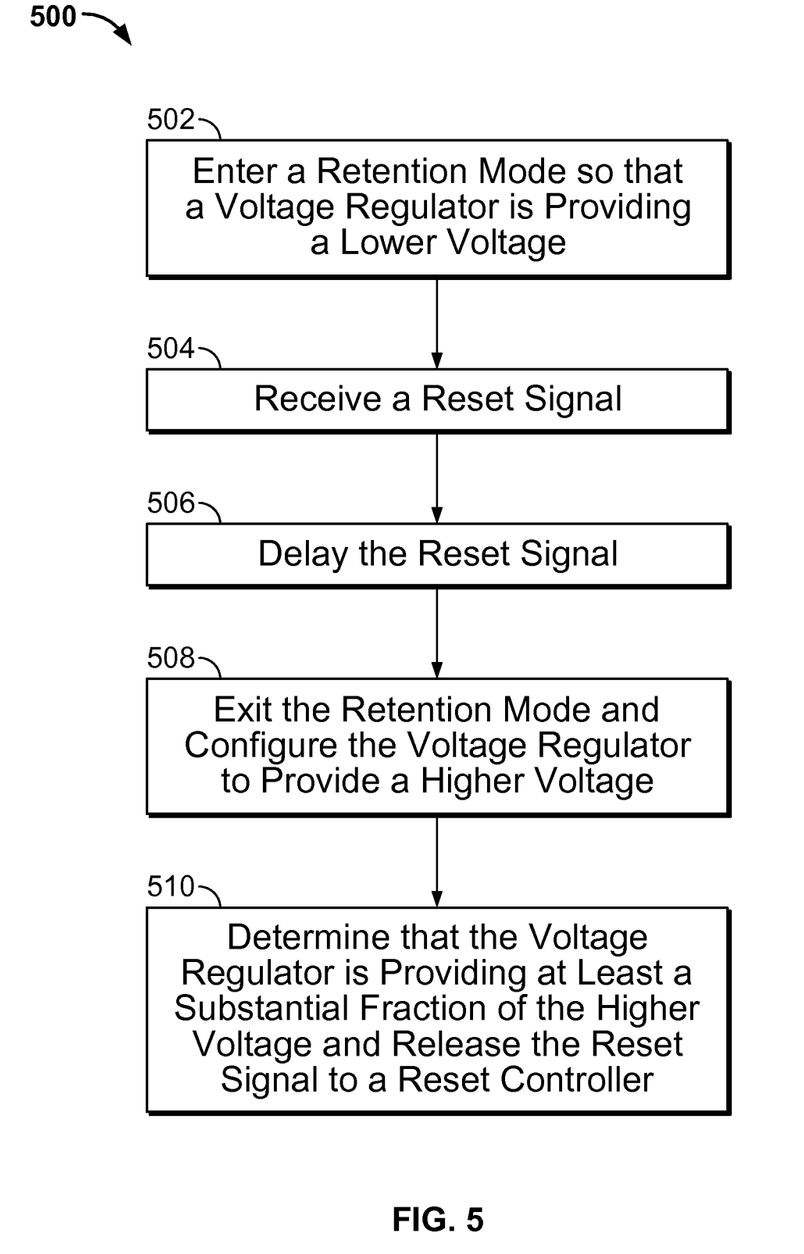
FIG. 5 is a flow diagram of an example process performed by a microcontroller.

FIG. 5 is a flow diagram of an example process 500 performed by a microcontroller. The microcontroller can be the microcontroller system 100 of FIG. 1.

The microcontroller enters a retention mode (502). In some implementations, the microcontroller freezes a system clock. In some implementations, the microcontroller causes a voltage regulator to provide a lower voltage.

During the retention mode, the microcontroller receives a reset signal (504). The microcontroller delays the reset signal (506). In some implementations, delaying the reset signal includes passing the reset signal through a delay chain coupled to a latch. The microcontroller exits the retention mode (508). In some implementations, the power manager causes the voltage regulator to provide a higher voltage.

The microcontroller determines that the voltage regulator is providing at least a substantial fraction of the higher voltage and, in response, releases the reset signal, e.g., to a reset controller or a device coupled to the reset controller (510). The microcontroller can also wake the clock. In some implementations, determining that the voltage regulator is providing at least a substantial fraction of the higher voltage comprises receiving a ready signal from the voltage regulator.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A microcontroller system comprising:
   a reset controller;
   a reset delaying module coupled to the reset controller; and
   a reset source coupled to the reset delaying module;
   wherein the reset delaying module is configured to perform operations comprising:
   during a power saving mode, receiving a reset signal from the reset source;
   delaying the reset signal at least partially based on duration of the reset signal;
   waiting for a regulator ready signal from a voltage regulator; and
   receiving the regulator ready signal and, in response to receiving the regulator ready signal, releasing the reset signal to the reset controller;
   wherein the reset signal has a longer duration than a time between receiving the reset signal and receiving the regulator ready signal; and
   wherein the reset signal has a shorter duration than a time between receiving the reset signal and receiving the regulator ready signal so that the reset delaying module is configured to delay the reset signal for longer than the duration of the reset signal.

2. The microcontroller system of claim 1, wherein the voltage regulator is configured to provide a lower voltage during the power saving mode and a higher voltage on exiting the power saving mode, and wherein the voltage regulator is configured to provide a substantial fraction of the higher voltage after a regulator wakeup time has elapsed.

3. The microcontroller system of claim 2, further comprising a processor coupled to the reset controller and a clock coupled to the processor, wherein the clock is frozen during the power saving mode so that the reset delaying module operates asynchronously, and wherein the clock is configured to provide a clock signal on exiting the power saving mode.

4. The microcontroller system of claim 3, wherein the microcontroller is configured to enable the clock in response to receiving the regulator ready signal and the clock is configured to provide the clock signal after a clock wakeup time has elapsed.

5. The microcontroller system of claim 1, wherein the reset delaying module comprises a delay chain coupled to a latch.

6. The microcontroller system of claim 5, wherein the reset source is coupled to an input of the delay chain and an output of the delay chain is coupled to an input of the latch, and wherein an output of the latch is coupled to a plurality of logic gates coupled to the reset controller.

7. The microcontroller system of claim 6, wherein the reset source is coupled to the plurality of logic gates and the regulator is coupled to the plurality of logic gates.

8. The microcontroller system of claim 1, further comprising a plurality of additional reset sources and an additional reset delaying module for each additional reset source.

9. A method performed by a microcontroller, the method comprising:
   entering a power saving mode so that a voltage regulator is providing a lower voltage;
   during the power saving mode, receiving a reset signal;
   delaying the reset signal and exiting the power saving mode, including configuring the voltage regulator to provide a higher voltage higher than the lower voltage, wherein delaying the reset signal is at least partially based on a duration of the reset signal;
   determining that the voltage regulator is providing at least a substantial fraction of the higher voltage and, in response, releasing the reset signal to a reset controller;
   wherein the reset signal has a longer duration than a time between receiving the reset signal and determining that the voltage regulator is providing at least a substantial fraction of the higher voltage; and
   wherein the reset signal has a shorter duration than a time between receiving the reset signal and determining that the voltage regulator is providing at least a substantial fraction of the higher voltage, so that delaying the reset signal comprises delaying the reset signal for longer than the duration of the reset signal.

10. The method of claim 9, wherein determining that the voltage regulator is providing at least a substantial fraction of the higher voltage comprises receiving a ready signal from the voltage regulator.

11. The method of claim 9, wherein delaying the reset signal comprises passing the reset signal through a delay chain coupled to a latch.

12. The method of claim 9, wherein entering the power saving mode comprises freezing a clock, and wherein the method further comprises, in response to determining that the voltage regulator is providing at least a substantial fraction of the higher voltage, waking the clock.

13. The method of claim 12, further comprising, after waking the clock, waiting for a wakeup time of the clock and then exiting the power saving mode.

14. The method of claim 9, further comprising, after releasing the reset signal to the reset controller, propagating the reset signal to one or more digital modules.

15. The method of claim 14, wherein entering the power saving mode comprises configuring the voltage regulator to have a lower output current capability, and wherein configuring the voltage regulator to provide a higher voltage further comprises configuring the voltage regulator to have a higher output current capability.

16. The method of claim 15, wherein the one or more digital modules are configured to draw a current between the lower output current capability and the higher output current capability.

* * * * *

UNITED STATES PATENT AND TRADEMARK OFFICE
CERTIFICATE OF CORRECTION

| | | |
|---|---|---|
| PATENT NO. | : 9,213,388 B2 | Page 1 of 1 |
| APPLICATION NO. | : 13/785999 | |
| DATED | : December 15, 2015 | |
| INVENTOR(S) | : Patrice Menard et al. | |

It is certified that error appears in the above-identified patent and that said Letters Patent is hereby corrected as shown below:

In the specification,

Column 1, Line 41; Delete "running" and insert -- running. --, therefor.

In the claims,

Column 5, Line 36; In Claim 1, delete "based on" and insert -- based on a --, therefor.

Signed and Sealed this
Twenty-ninth Day of March, 2016

Michelle K. Lee
*Director of the United States Patent and Trademark Office*